United States Patent
Fujita et al.

(10) Patent No.: US 6,570,685 B1
(45) Date of Patent: May 27, 2003

(54) NODE FOR OPTICAL COMMUNICATION AND WAVELENGTH-DIVISION MULTIPLEXING TRANSMISSION APPARATUS HAVING A RING STRUCTURE COMPOSED OF THE SAME NODES

(75) Inventors: Sadao Fujita, Tokyo (JP); Koji Asahi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/255,739

(22) Filed: Feb. 23, 1999

(30) Foreign Application Priority Data

Mar. 3, 1998 (JP) .......................... 10/050414

(51) Int. Cl.[7] ................................. H04J 14/02
(52) U.S. Cl. ................. 359/124; 359/110; 359/119; 359/127; 359/128; 359/173
(58) Field of Search .................. 359/110, 119, 359/124, 127, 128, 173

(56) References Cited

U.S. PATENT DOCUMENTS

| | | | | |
|---|---|---|---|---|
| 6,023,359 A | * | 2/2000 | Asahi | 359/110 |
| 6,046,833 A | * | 4/2000 | Sharma et al. | 359/110 |
| 6,137,603 A | * | 10/2000 | Henmi | 359/110 |
| 6,195,186 B1 | * | 2/2001 | Asahi | 359/110 |
| 6,222,653 B1 | * | 4/2001 | Asahi | 359/110 |

FOREIGN PATENT DOCUMENTS

| | | |
|---|---|---|
| JP | 4-9929 | 1/1992 |
| JP | 4-33437 | 2/1992 |
| JP | 4-236527 | 8/1992 |

(List continued on next page.)

OTHER PUBLICATIONS

Japanese Office Action, dated Jun. 27, 2000, with English language translation of Japanese Examiner's comments.

Uehara, D., Asahi, K., Nakabayashi, Y., Yamashita, M., Konishi, C. & Fujita, S., "Highly Reliable and Economical WDM Ring with Optical Self–Healing and 1:N Wavelength Protection," *Proceedings of the 1997 Communications Society Conference of the IEICE*, Sep. 3–6, 1997, p. 383.

(List continued on next page.)

*Primary Examiner*—Jason Chan
*Assistant Examiner*—Dzung Tran
(74) *Attorney, Agent, or Firm*—Whitham, Curtis & Christofferson, P.C.

(57) ABSTRACT

Each node of an optical ring system having m nodes connected multiplexes wavelengths of $\lambda 1$ to $\lambda n$ in optical wavelength division and transmits signals. This optical ring system is composed of working optical fibers (102-1 and 102-2) and protection optical fibers (102-3 and 102-4). Each node is composed of 4×4 optical switches (111 and 112), a first optical preamplifier (151), a first wavelength demultiplexer (152), a first wavelength multiplexer (153), a first optical booster amplifier (154), a second optical preamplifier (155), a second wavelength demultiplexer (156), a second wavelength multiplexer (157), a second optical booster amplifier (158), a third optical preamplifier (159), a third wavelength demultiplexer (160), a third wavelength multiplexer (161), a third optical booster amplifier (162), a fourth optical preamplifier (163), a fourth wavelength demultiplexer (164), a fourth wavelength multiplexer (165), a fourth optical booster amplifier (166), and line terminals (167-1 to 167-3). In each node, 2×2 optical switches (121-1 to 121-n and 122-1 to 122-n) are connected in the working optical paths, and 2×2 optical switches (123-1 to 123-n and 124-1 to 124-n) are connected in the protection optical paths.

16 Claims, 15 Drawing Sheets

FOREIGN PATENT DOCUMENTS

| | | |
|---|---|---|
| JP | 6-209284 | 7/1994 |
| JP | 6-303192 | 10/1994 |
| JP | 8-18592 | 1/1996 |
| JP | 8-32522 | 2/1996 |
| JP | 8-149088 | 6/1996 |
| JP | 9-238370 | 9/1997 |
| JP | 9-307577 | 11/1997 |
| JP | 10-112700 | 4/1998 |
| JP | 10-164025 | 6/1998 |
| JP | 10-285119 | 10/1998 |
| JP | 11-225118 | 8/1999 |

OTHER PUBLICATIONS

D. Uehara et al., "Highly Reliable and Economical WDM Ring with Optical Self–Healing and 1:N Wavelength Protection", Conference Publication (1997) of the 11$^{th}$ International Conference on Integrated Optics and Optical Fiber Communications, 23$^{rd}$ European Conference on Optical Communications.

* cited by examiner

Fig.4
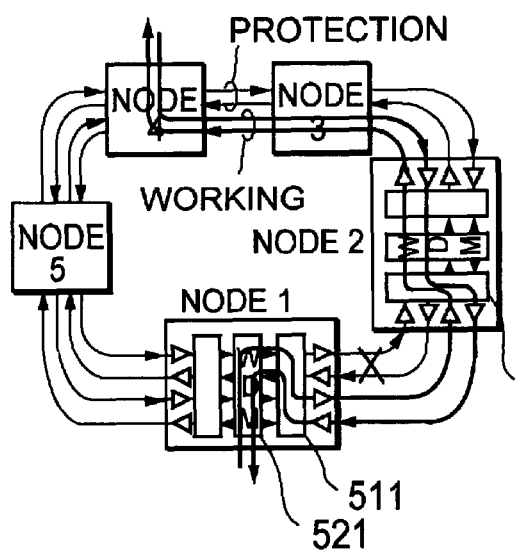
(a) WORKING FIBER CUT
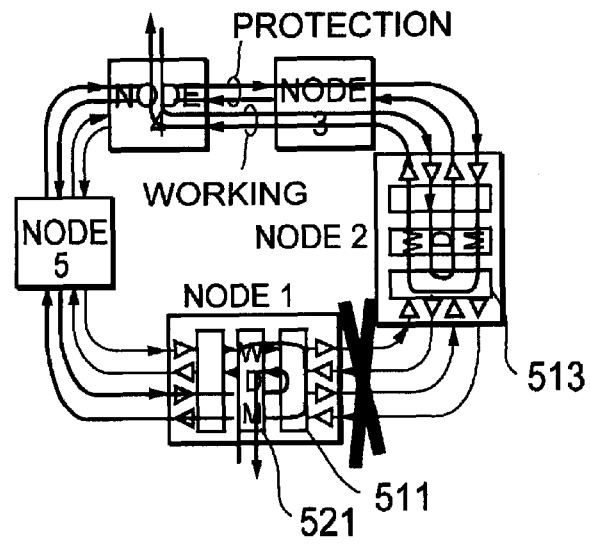
(b) ALL FIBER CUT (a) WORKING FIBER CUT

NODE FOR OPTICAL COMMUNICATION AND WAVELENGTH-DIVISION MULTIPLEXING TRANSMISSION APPARATUS HAVING A RING STRUCTURE COMPOSED OF THE SAME NODES

BACKGROUND OF THE INVENTION

1. Field of the Invention

The present invention relates to an optical transmission apparatus, and particularly to an optical ring system using a wavelength-division multiplexing technology and the structure of a node for optical communication used in the optical ring system.

2. Description of Related Art

A prior art of an optical transmission apparatus having a ring structure in which a plurality of nodes are connected in the form of a ring is described with reference to FIGS. 1 and 2. The prior art is described in detail in a paper entitled "Highly Reliable and Economical WDM Ring with Optical Self-Healing and 1:N Wavelength Protection" by Uehara et al., printed in the Conference Publication (published in 1997) of the 11th International Conference on Integrated Optics and Optical Fiber Communications, 23rd European Conference on Optical Communications.

FIG. 1 shows the configuration of an optical transmission apparatus according to a first prior art. An optical transmission apparatus shown in FIG. 1 has been implemented by combination of a wavelength-multiplexed optical transmission technology and a 4-fiber-ring transmission apparatus. FIG. 1 shows an example of an optical ring system using m nodes. Each of the nodes included in the system multiplexes optical signals having wavelengths of $\lambda 1$ to $\lambda n$ and transmits them as a wavelength-division-multiplexed optical signal.

The optical transmission apparatus shown in FIG. 1 is composed of optical add/drop multiplexing nodes 301-1 to 301-m, transmission path optical fibers 302-1 to 302-4 (302-1: counterclockwise working system, 302-2: clockwise working system, 302-3: counterclockwise protection system, and 302-4: clockwise protection system), an optical preamplifier 351, a wavelength demultiplexer 352, a wavelength multiplexer 353, an optical booster amplifier 354, an optical preamplifier 355, a wavelength demultiplexer 356, a wavelength multiplexer 357, an optical booster amplifier 358, an optical preamplifier 359, a wavelength demultiplexer 360, a wavelength multiplexer 361, an optical booster amplifier 362, an optical preamplifier 363, a wavelength demultiplexer 364, a wavelength multiplexer 365, an optical booster amplifier 366, an add/drop multiplexers (ADM) 367-1 to 367-n, and transponders (TRPD) 371 to 378 each regeneratively repeating by converting a received optical signal into an electrical signal and converting again it into an optical signal.

In FIG. 1, the m nodes are connected with one another in the form of a ring by a total of four transmission path optical fibers two of which connect bi-directionally the working system and the other two of which connect bi-directionally the protection system. Each of the nodes sends out an optical signal obtained by multiplexing n wavelengths of $\lambda 1$ to $\lambda n$ in wavelength division to each of the four optical fiber transmission paths. And each of the nodes receives an optical signal obtained by multiplexing n wavelengths of $\lambda 1$ to $\lambda n$ in wavelength division from each of the four optical fiber transmission paths.

Next, operation in each of the nodes of an optical transmission apparatus of a former ring structure having the above-mentioned structure is described in the following.

An optical signal received from a transmission path optical fiber of the counterclockwise working system is amplified by the optical preamplifier 351 and is demultiplexed by the wavelength demultiplexer 352 into n wavelength components of $\lambda 1$ to $\lambda n$. Hereupon, the n optical signals of $\lambda 1$ to $\lambda n$ obtained by wavelength-demultiplexing are respectively inputted into the add/drop multiplexers (ADM) 367-1 to 367-n. That is to say, an optical signal of $\lambda 1$ is inputted into the ADM 367-1, an optical signal of $\lambda 2$ is inputted into the ADM 367-2, and an optical signal of $\lambda n$ is inputted into the ADM 367-n. And n optical signals of $\lambda 1$ to $\lambda n$ in wavelength are outputted from the ADM's 367-1 to 367-n. Through the transponders 371 to 378, an optical signal of $\lambda 1$ in wavelength is outputted from the ADM 367-1, an optical signal of $\lambda 2$ in wavelength is outputted from the ADM 367-2, and an optical signal of $\lambda n$ in wavelength is outputted from the ADM 367-n. The n optical signals of $\lambda 1$ to $\lambda n$ in wavelength outputted from the ADM's 367-1 to 367-n are multiplexed in wavelength division by the wavelength multiplexer 353. Optical output of the wavelength multiplexer 353 is amplified by the optical booster amplifier 354 and then is sent out to the optical fiber transmission path of the counterclockwise working system. Also with regard to optical signals transmitted and received through the other transmission paths, namely, the clockwise working system 302-2, counterclockwise protection system 302-3 and clockwise protection system 302-4, the multiplexing and demultiplexing operations of wavelengths of $\lambda 1$ to $\lambda n$ are performed in the same way as the above-mentioned operation. In FIG. 1, the optical preamplifier 355, the wavelength demultiplexer 356, the wavelength multiplexer 357 and the optical booster amplifier 358 are applied to the clockwise working system, the optical preamplifier 359, the wavelength demultiplexer 360, the wavelength multiplexer 361 and the optical booster amplifier 362 are applied to the counterclockwise protection system, and the optical preamplifier 363, the wavelength demultiplexer 364, the wavelength multiplexer 365 and the optical booster amplifier 366 are applied to the clockwise protection system.

Operation in the ADM 367-1 is as follows.

Each of the four optical signals of $\lambda 1$ in wavelength inputted by the wavelength demultiplexers 352, 356, 360 and 364 is processed by an optical/electrical (O/E) conversion, an overhead signal termination and a time-division demultiplexing process in a high-speed signal reception interface part (HSRx), and then is inputted into a cross-connecting part (TSA) as an electrical data signal. And the electrical data signals are each inputted from the cross-connecting part (TSA) into the high-speed signal transmission interface part (HSTx), and are each processed by a time-division multiplexing process, an overhead signal insertion and an electrical/optical (E/O) conversion, and then an optical signal of $\lambda 1$ in wavelength is outputted to the wavelength multiplexers 353, 357, 361 and 365. A cross-connecting part (TSI) has a function of selectively connecting four pairs of electrical data signals inputted from the high-speed signal reception interface part (HSRx) and four pairs of electrical data signals to be outputted to the high-speed signal transmission interface part (HSTx) according to a state of breakage of a transmission path and the like in the ring network, and a function of disconnecting or connecting a part or the whole of an inputted electrical data signal from or with a low-speed signal interface part (LS) and inserting a signal from the low-speed signal interface part (LS) into an output signal.

This optical ring system, in case that a transmission path breaks down, changes over an optical signal being transmitted in the working system transmission path to a transmission path of the protection system by changing over the path in the cross connection part (TSI) by an electrical switch and thereby recovers the transmission path from the breakdown. That is to say, in case that break of an optical transmission path of the working system has occurred, the switch of the cross-connecting part (TSI) in each ADM operates to change over an optical signal transmission path from the working system to the protection system.

Communication through the protection system optical transmission path performed by the first prior art is called Standby-Line-Access, and makes possible two kinds of communication using the working system and the protection system in case that no failure occurs on the optical transmission path. It is a matter of course that since communication through the protection system optical transmission path is changed over to communication through the working system in case of a failure of break of the transmission path, communication through the protection system during an ordinary working period becomes impossible in case of failure.

Next, a ring-shaped optical transmission apparatus according to a second prior art is described as follows. FIG. 2 shows an example of an optical ring structure using m nodes, and each of the nodes multiplexes optical signals having wavelengths of λ1 to λn in wavelength division and transmits them as a wavelength-division-multiplexed optical signal.

The optical transmission apparatus shown in FIG. 2 is composed of optical add/drop multiplexers 401-1 to 401-m, transmission path optical fibers 402-1 to 402-4 (402-1: counterclockwise working system, 402-2: clockwise working system, 402-3: counterclockwise protection system, and 402-4: clockwise protection system), an optical preamplifier 451, a wavelength demultiplexer 452, a wavelength multiplexer 454, an optical booster amplifier 455, an optical preamplifier 456, a wavelength demultiplexer 457, a wavelength multiplexer 458, an optical booster amplifier 459, an optical preamplifier 460, an optical booster amplifier 461, an optical preamplifier 462, an optical booster amplifier, 463, an 8×8 optical matrix switch 470 having 8 inputs and 8 outputs, an 8×8 optical matrix switch 471, a 4×4 optical matrix switch 480 and a 4×4 optical matrix switch 481.

The optical transmission apparatus of FIG. 2 according to the second prior art introduces the 4×4 optical switches 480 and 481 as a recovery measure against break of an optical transmission path and the like. By this, the second prior art reduces to about half the scale of the electrical switches/HSTx/HSRx in the optical add/drop multiplexer shown in the first prior art and reduces the cost of a node in comparison with the optical transmission apparatus of FIG. 1 according to the first prior art.

The optical transmission apparatuses according to the above-mentioned prior arts have problems as shown in the following.

First, the optical ring system according to the first prior art converts every input optical signal into an electrical signal regardless of whether it should be dropped or not. Therefore, although an inputted optical signal requiring no conversion to an electrical signal and no reconversion to an optical signal is included in inputted signals, an add/drop multiplexer (ADM) for processing a data signal of 1 wavelength in each node requires four high-speed signal transmission/reception interface parts for all the transmission paths and cross-connecting circuits for route-changing all signals connected with these high-speed signal transmission/reception interface parts. Accordingly, there has been a problem that an optical ring system of n wavelengths requires the devices n times this case and results in becoming very expensive and large-scale.

And the optical ring system according to the second prior art aims at making small-sized/economical apparatus by integrating switches each required for each path into a 4×4 optical switch in order to solve the problem of the first prior art. However, since an optical transmission path of the protection system is dedicated to protection of the working system, there is a problem that communication using an optical transmission path of the protection system, the communication being performed in the first prior art, becomes impossible. That is to say, since communication is performed only by the working system in the second prior art, the circuit utilizing efficiency of the ring is low.

SUMMARY OF THE INVENTION

An object of the present invention is to provide a wavelength-division multiplexing optical transmission apparatus having a simple structure and further having highly reliable nodes for optical communication and a ring structure composed of the same nodes.

An optical communication node according to the present invention comprises a plurality of optical switches each having at least one optical input terminal and at least one optical output terminal, wherein an optical signal from the outside is inputted to the at least one optical input terminal, and each of the at least one optical input terminal and each of the at least one optical output terminal are selectively connected with each other.

This optical communication node is provided with at least one wavelength demultiplexer for demultiplexing a wavelength-multiplexed light inputted into the optical communication node into the respective wavelength signal lights and inputting each of the wavelength signal lights into each of the at least one optical input terminal, and at least one optical signal merging device for merging and sending out a plurality of optical signals outputted from a part of the at least one optical output terminal to a single output transmission path.

The wavelength demultiplexer and the optical coupler contained in the optical communication node each comprise an arrayed waveguide grating (AWG).

A first optical communication node according to the present invention comprises a first optical switch in which the plurality of optical transmission paths to be connected to first input and output terminals are connected respectively to its plurality of input terminals and which selectively connects each of the plurality of input terminals and each of the plurality of output terminals to each other, a second optical switch in which the plurality of optical transmission paths to be connected to second input and output terminals are connected respectively to its plurality of output terminals and which selectively connects each of the plurality of input terminals and each of the plurality of output terminals to each other, a first to an Mth (M is a natural number, and hereinafter the same) wavelength demultiplexer in each of which its input terminal is connected with the plurality of output terminals of the first optical switch and the plurality of output terminals of the second optical switch and each of which demultiplexes an inputted wavelength-multiplexed optical signal into optical signals of the respective wavelengths, a first to an Nth (N is a natural number, hereinafter the same) optical coupler in each of which its output terminal is connected with the plurality of input terminals of the first optical switch and the plurality of input terminals of the second optical switch and each of which couples and sends out plural inputted optical signals to a single output transmission path, and a third optical switch in which the output terminals of the first to Mth wavelength demultiplexers are connected with its input ports and the input terminals of the first to Nth optical couplers are connected with its output ports and which selectively connects each of the input ports and each of the output ports to each other.

A second optical communication node according to the present invention comprises a first to a fourth wavelength demultiplexer, a first to a fourth optical coupler, a first optical switch in which the input terminals of the first and second wavelength demultiplexers are respectively connected with its first and third output ports, the second working optical path is connected with its second output port, the second protection optical path is connected with its fourth output port, the output terminals of the first and second optical couplers are respectively connected with its second and fourth input ports, the first working optical path is connected with its first input port, and the first protection optical path is connected with its third input port, a second optical switch in which the input terminals of the third and fourth wavelength demultiplexers are respectively connected with its second and fourth output ports, the first working optical path is connected with its first output port, the first protection optical path is connected with its third output port, the output terminals of the third and fourth optical couplers are respectively connected with its first and third input ports, the second working optical path is connected with its second input port, and the second protection optical path is connected with its fourth input port, and a third optical switch in which the output terminals of the first to fourth wavelength demultiplexers are connected with its input ports and the input terminals of the first to fourth optical couplers are connected with its output ports.

The third optical switch contained in the second optical communication node is provided with a plurality of 2-input optical switches in which the first input ports are connected with the output terminals of the first to fourth wavelength demultiplexers and the first output ports are connected with the input terminals of the first to fourth optical couplers, and which selectively outputs an optical signal inputted through an input port from one of the output ports according to a selection signal applied from the outside.

The second optical communication node further comprises a first to an eighth transponder each having a function for converting once each of optical signals inputted from plural input terminals into an electrical signal and converting them again into optical signals and outputting them through plural output terminals, the first to fourth transponders being respectively inserted between the first to fourth wavelength demultiplexers and the third optical switch, and the fifth to eighth transponders being respectively inserted between the first to fourth optical couplers and the third optical switch.

The third optical switch is provided with a plurality of 2-input optical switches in which the first input ports are respectively connected with the plural output terminals of the first to fourth transponders, the first output ports are respectively connected with the plural input terminals of the fifth to eight transponders, and which selectively output an optical signal inputted through an input port from one of the output ports according to a selection signal applied from the outside.

The transponder comprises an optical receiver which converts an optical signal inputted from each of the plural input terminals into a reception electrical signal of an electrical signal and outputs it, an optical state monitoring circuit which detects a state of the optical signal by monitoring the reception electrical signal and outputs it as a monitor signal, and an optical transmitting circuit which converts the reception electrical signal into a transmission optical signal and outputs it to the plural output terminals.

The second communication node further comprises a receiving circuit in which its reception signal input terminal is connected with the second output ports of some 2-input optical switches out of the plural 2-input optical switches and which converts a reception optical signal inputted through the reception signal input terminal into an electrical signal, and a transmitting circuit in which its transmission signal output terminal is connected with the second input ports of some 2-input optical switches out of the plural 2-input optical switches and which converts an electrical signal into an optical signal and outputs the transmission optical signal through the transmission signal output terminal.

And the second optical communication node further comprises a fourth optical switch in which its input ports are connected with the second output ports of the plural 2-input optical switches and its output ports are connected with the second input ports of the plural 2-input optical switches, a receiving means in which its reception signal input terminal is connected with the output ports of the fourth optical switch and which converts a reception optical signal inputted through the reception signal input terminal into an electrical signal, and a transmitting means in which its transmission signal output terminal is connected with the input ports of the fourth optical switch and which converts an electrical signal into an optical signal and outputs the transmission optical signal through the transmission signal output terminal.

Each of the first to fourth wavelength demultiplexers and the first to fourth optical couplers contained in the second optical communication node comprises an arrayed waveguide grating.

Each of the first to fourth optical couplers of the second optical communication node comprises an optical tree coupler.

The second optical communication node further comprises at least one first optical amplifier inserted between two connection points of the first working optical path and the optical communication node, at least one second optical amplifier inserted between two connection points of the second working optical path and the optical communication node, at least one third optical amplifier inserted between two connection points of the first protection optical path and the optical communication node, and at least one fourth optical amplifier inserted between two connection points of the second protection optical path and the optical communication node.

Each of these first to fourth optical amplifiers is provided with an optical fiber amplifier or a semiconductor optical amplifier.

An optical transmission apparatus according to the present invention is an optical transmission apparatus in which plural optical communication nodes are connected in the form of a ring through a first and a second working system optical transmission path and a first and a second protection system optical transmission path, and which transmits a wavelength-multiplexed optical signal, the optical transmission apparatus comprising a first to a fourth wavelength demultiplexer, a first to a fourth optical coupler, a first optical switch in which the input terminals of the first and second wavelength demultiplexers are respectively connected with its first and third output ports, the second working optical path is connected with its second output port, the second protection optical path is connected with its fourth output port, the output terminals of the first and second optical couplers are respectively connected with its second and fourth input ports, the first working optical path is connected with its first input port, and the first protection optical path is connected with its third input port, a second optical switch in which the input terminals of the third and fourth wavelength demultiplexers are respectively connected with its second and fourth output ports, the first working optical path is connected with its first output port, the first protection optical path is connected with its third output port, the output terminals of the third and fourth optical couplers are respectively connected with its first and third input ports, the second working optical path is connected with its second input port, and the second protection optical path is connected with its fourth input port, and a third optical switch in which the output terminals of the first to fourth wavelength demultiplexers are connected with its input ports and the input terminals of the first to fourth optical signal multiplexers are connected with its output ports.

At least one of the plural optical communication nodes forming the optical transmission apparatus further comprises a fourth optical switch in which its input ports are connected with the second output ports of the plural 2-input optical switches and its output ports are connected with the second input ports of the plural 2-input optical switches, a receiving means in which its reception signal input terminal is connected with the output ports of the fourth optical switch and which converts a reception optical signal inputted through the reception signal input terminal into an electrical signal, and a transmitting means in which its transmission signal output terminal is connected with the input ports of the fourth optical switch and which converts an electrical signal into an optical signal and outputs the transmission optical signal through the transmission signal output terminal.

A transmission apparatus failure recovering method according to the present invention comprises a process of detecting that a second working system optical transmission path and a first working system optical transmission path have become untransmissible between the two optical communication nodes being adjacent to each other which are used in the optical transmission apparatus, and a process of changing over the internal connections to the first input port and the second output port respectively to the third input port and the fourth output port in the first optical switch, and changing over the internal connections to the first output port and the second input port respectively to the third output port and the fourth input port in the second optical switch with regard to the internal connection state of an optical switch being closer to the untransmissible failure point out of the first and second optical switches contained in the two optical communication nodes, in case of detecting that they have become untransmissible.

A transmission apparatus failure recovering method according to the present invention comprises a process of detecting that all optical transmission paths have become untransmissible between the two optical communication nodes being adjacent to each other, and a process of changing over the internal connections to the first input port and the second output port respectively to the fourth input port and the third output port in the first optical switch, and changing over the internal connections to the first output port and the second input port respectively to the fourth output port and the third input port in the second optical switch with regard to the internal connection state of an optical switch being closer to the untransmissible failure point out of the first and second optical switches contained in the two optical communication nodes, in case of detecting that they have become untransmissible.

According to the present invention, plural cross-connecting circuits which have been provided for coping with such a failure of a transmission path as break of an optical fiber or the like in a structure according to the first prior art can be substituted with only the first and second optical path switching means provided in each optical communication node. Therefore, the apparatus can be made small-sized and economical. Furthermore, a structure being independent of the bit rate of a transmitted optical signal can be used thanks to replacing the cross-connecting circuits with the optical path switching means each being an optical circuit.

And according to the present invention, since each node switches over and introduces only optical signals to be dropped with an optical switch to a high-speed signal reception interface and passes signals to be passed through the node leaving as they are optical signals, it is possible to reduce the number of necessary high-speed signal transmission/reception interfaces and from this point also it is possible to reduce the cost.

And in the present invention, a 2-input switch contained in a third optical path switching means in each optical communication node performs connection of a main signal to a working optical path or connection of a main signal to a protection system transmission path. An optical transmission apparatus can be arbitrarily connected with any of the working system and the protection system through this 2-input optical switch. The optical transmission apparatus connected with the protection system transmits information other than information transmitted by the working system, namely, makes it possible to perform a communication called "Standby-Line-Acces" at an ordinary time when no failure occurs on the transmission path, and the transmission capacity of the system can be doubled.

Moreover, the present invention provides the fourth optical path switching means between the third optical path switching means and a receiving means, and between the third optical path switching means and a transmitting means. This fourth optical path switching means improves the degree of freedom of connection (rerouting) of the optical transmission apparatus and a ring-shaped optical transmission path, and facilitates a path setting operation in a large-scale node.

BRIEF DESCRIPTION OF THE DRAWINGS

The above and other objects, features and advantages of the present invention will become more apparent from the following detailed description when taken in conjunction with the accompanying drawings wherein:

FIG. 4 is a diagram for explaining a recovery operation in case that a failure has occurred in a first or second embodiment of an optical transmission apparatus of the present invention;

DETAILED DESCRIPTION OF THE PREFERRED EMBODIMENTS

Embodiment 1

Figure 1:
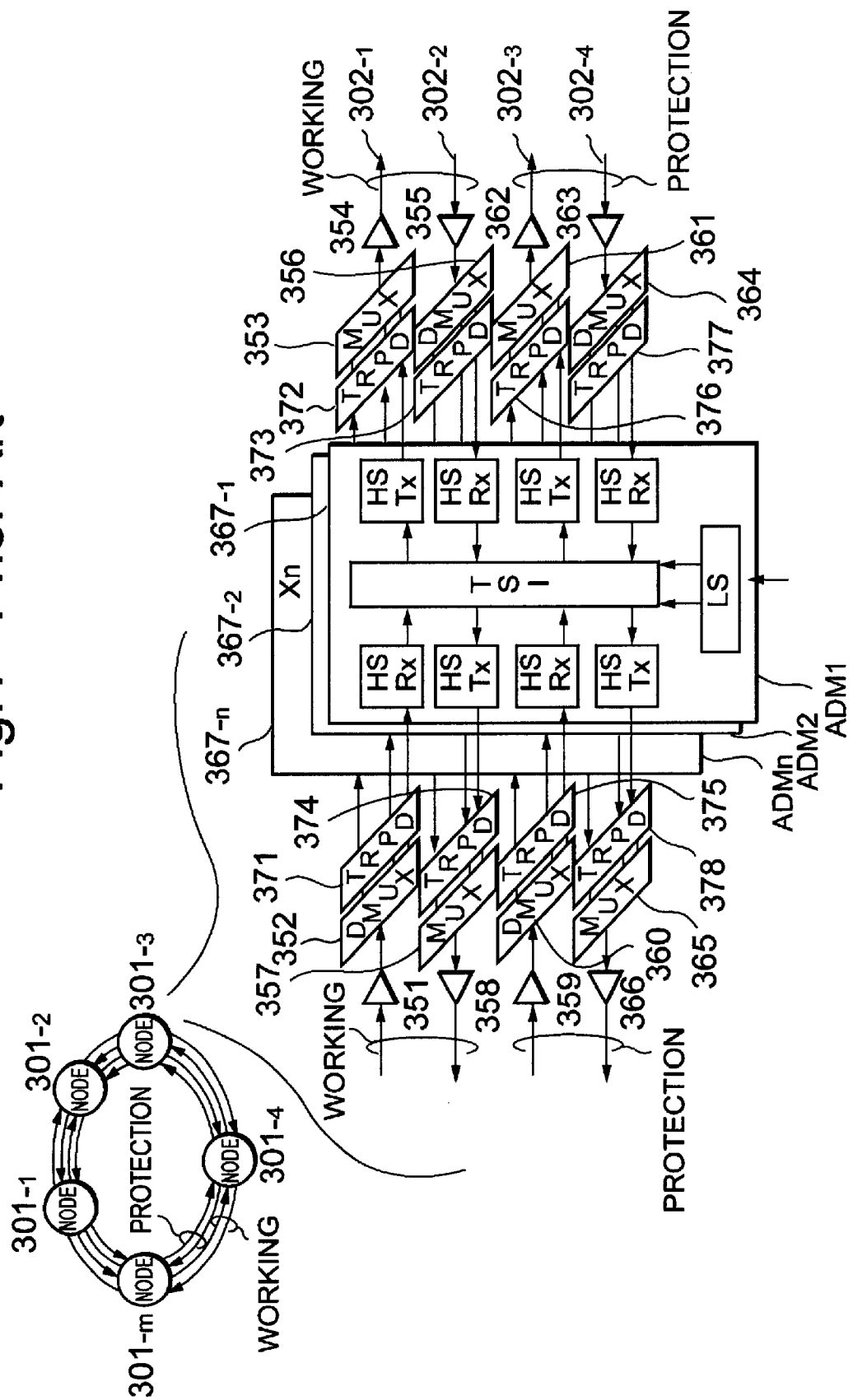
FIG. 1 shows the configuration of a wavelength-division multiplexing optical transmission apparatus having a ring structure according to the first prior art.
Figure 2:
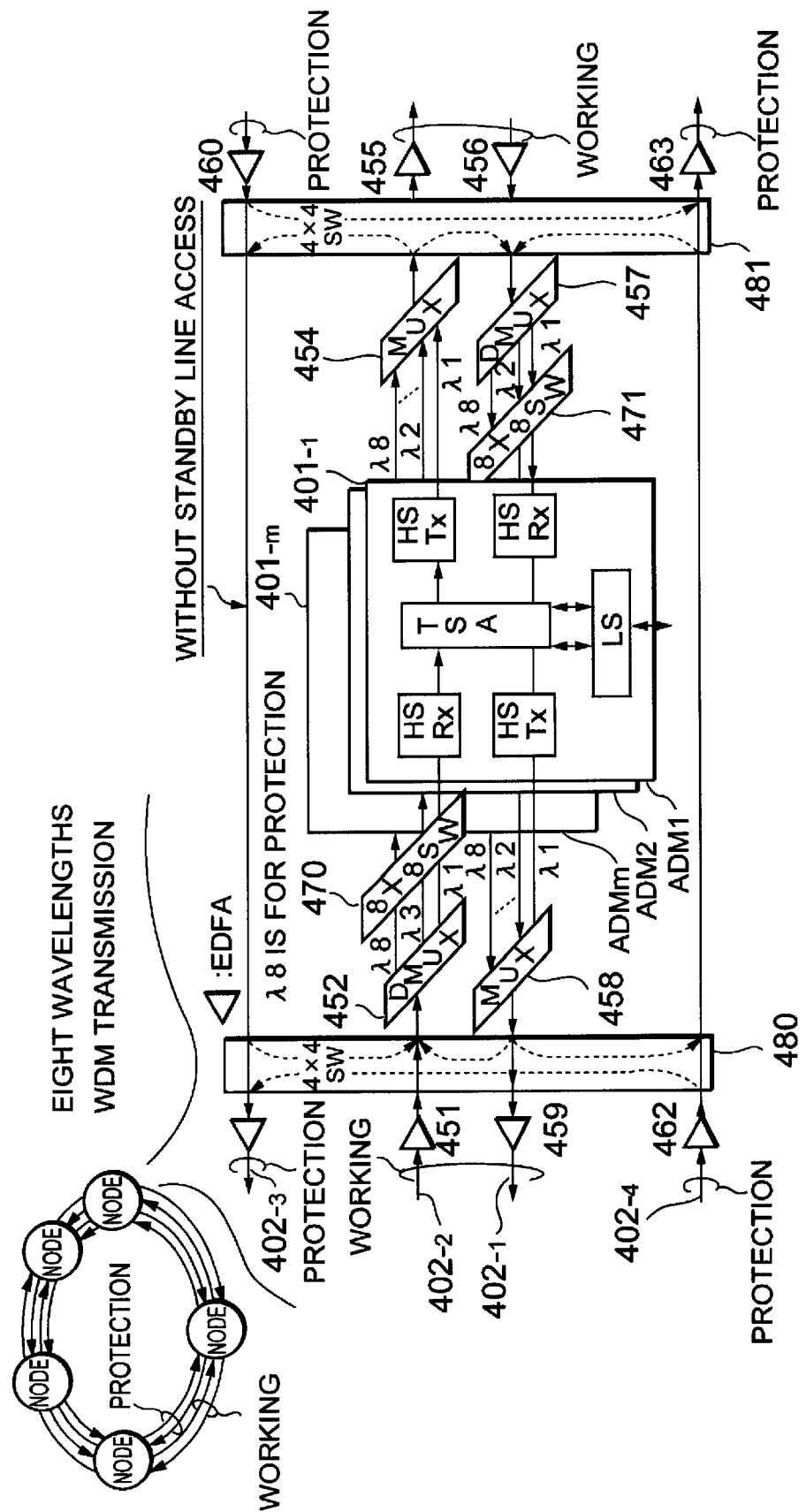
FIG. 2 shows the configuration of a wavelength-division multiplexing optical transmission apparatus having a ring structure according to the second prior art.
Figure 3:
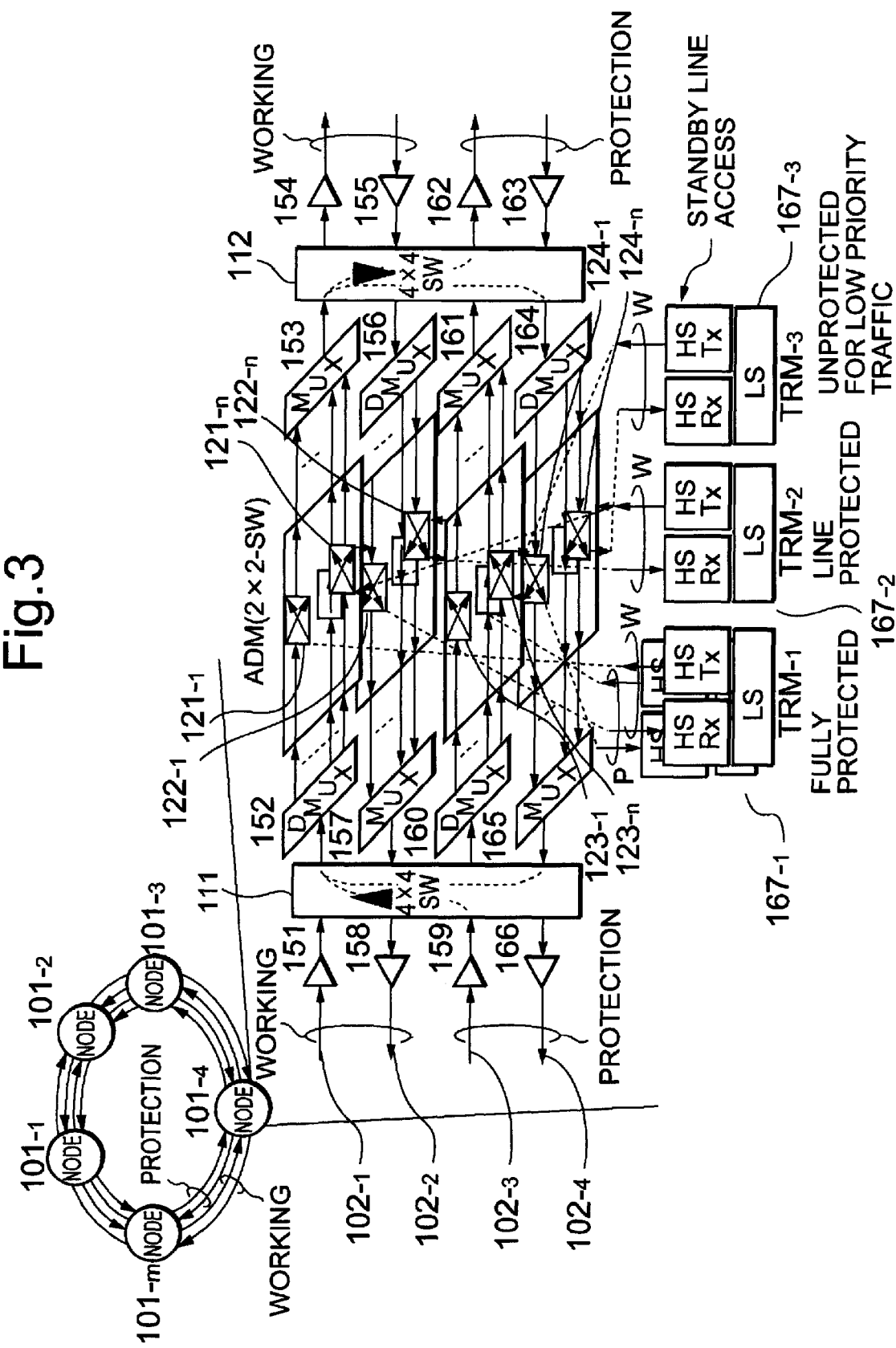
FIG. 3 is a diagram showing the configuration of a first embodiment of an optical transmission apparatus of the present invention.

FIG. 3 shows a first embodiment of an optical wavelength-division multiplexing ring system according to the present invention. FIG. 3 is an example of an optical ring system using m nodes. Each node transmits wavelength-division multiplexed optical signals having wavelengths of $\lambda 1$ to $\lambda n$. An optical ring system shown in FIG. 3 is composed of transmission path optical fibers 102-1 to 102-4 (102-1: working fiber for counterclockwise transmission, 102-2: working fiber for clockwise transmission, 102-3: protection fiber for counterclockwise transmission, and 102-4: protection fiber for clockwise transmission), 4×4 optical switches 111 and 112, a first optical preamplifier 151, a first wavelength demultiplexer 152, a first wavelength multiplexer 153, a first optical booster amplifier 154, a second optical preamplifier 155, a second wavelength demultiplexer 156, a second wavelength multiplexer 157, a second optical booster amplifier 158, a third optical preamplifier 159, a third wavelength demultiplexer 160, a third wavelength multiplexer 161, a third optical booster amplifier 162, a fourth optical preamplifier 163, a fourth wavelength demultiplexer 164, a fourth wavelength multiplexer 165, a fourth optical booster amplifier 166, and optical transmission apparatuses (line terminals) 167-1 to 167-3. In this figure, HS-Tx is a high-speed optical transmitter, HS-Rx is a high-speed optical receiver, and LS is a low-speed signal interface.

2×2 optical switches 121-1 to 121-n are connected in the counterclockwise working fiber, 2×2 optical switches 122-1 to 122-n are connected in the clockwise working fiber, 2×2 optical switches 123-1 to 123-n are connected in the counterclockwise protection fiber, and 2×2 optical switches 124-1 to 124-n are connected in the clockwise protection fiber.

An optical fiber amplifier or a semiconductor optical amplifier can be used as the optical booster amplifier and the optical preamplifier. And an arrayed waveguide grating can be used as a wavelength multiplexer used in this embodiment as an optical signal coupling means. Moreover, it is also possible to use an optical tree coupler in place of a wavelength multiplexer, as an optical signal coupling means.

In FIG. 3, the m nodes (101-1 to 101-m) are connected with one another to form a ring by a total of 4 transmission path optical fibers two of which connect bi-directionally the working fiber and the other two of which connect bi-directionally the protection fiber. Each of the nodes sends out a wavelength-division multiplexed optical signals having n wavelengths of $\lambda 1$ to $\lambda n$ to each of the optical fiber transmission paths. And each of the nodes receives wavelength-division multiplexed optical signals having n wavelengths of $\lambda 1$ to $\lambda n$ from each of the optical fiber transmission paths.

Operation of each node in a normal state, namely, in case that no failure occurs is as follows.

An optical signal received from the working fiber for counterclockwise transmission is inputted through the optical preamplifier 151 to the 4×4 optical switch 111, and is demultiplexed into n wavelength components of $\lambda 1$ to $\lambda n$ by the wavelength demultiplexer 152. Hereupon, the n optical signals of $\lambda 1$ to $\lambda n$ obtained by wavelength-demultiplexing are inputted into an optical ADM (add/drop multiplexer) composed of the 2×2 optical switches 121-1 to 121-n, respectively. These optical ADM's are respectively composed of the 2×2 optical switches (121-1 to 121-n, 122-1 to 122-n, 123-1 to 123-n and 124-1 to 124-n) connected respectively with the working fiber for counterclockwise transmission, the working fiber for clockwise transmission, the protection fiber for counterclockwise transmission and the protection fiber for clockwise transmission, and each 2×2 optical switch passes an optical signal or connects it to one of the optical transmission apparatuses (167-1 to 167-3).

The n optical signals of $\lambda 1$ to $\lambda n$ in wavelength outputted from the optical ADM are wavelength-multiplexed into a single optical signal by the wavelength multiplexer 153, and the single optical signal is inputted through the 4×4 optical switch 112 into the optical booster amplifier 154 and amplified, and then is sent out to the working fiber for counterclockwise transmission.

In FIG. 3, an optical transmission output of the optical transmission apparatus 167-1 is connected to the 2×2 optical switch 121-1. Therefore, the output of the optical transmission apparatus 167-1 is sent out to the working fiber for counterclockwise transmission. And a signal from the working fiber for clockwise transmission is inputted through the 2×2 optical switch 122-1 into an optical receiver of the optical transmission apparatus 167-1. Moreover, with respect to protection system signals of the optical transmission apparatus 167-1, a protection system optical transmission output is inputted through the 2×2 optical switch 123-1 into the counterclockwise protection system and a protection system optical reception output is inputted through the 2×2 optical switch 124-1 of the clockwise protection system into the protection system receiver of the optical transmission apparatus 167-1.

A signal of the optical transmission apparatus as set above is completely duplicated. Therefore, a highly reliable communication can be secured by changing over the system from the working system to the protection system against breakage of an optical transmission path, failure of an optical transmission apparatus, and the like.

On the other hand, optical transmission output and optical receiving input for the optical transmission apparatus 167-2 are connected only to the working system of the ring. In this case, the optical transmission apparatus 167-2 itself is not duplicated, but since a signal is connected with the working system of the ring, a sufficient reliability can be secured against break of an optical transmission path.

Moreover, the optical transmission output and optical receiving input for the optical transmission apparatus 167-3 are connected to the protection system of the ring.

In this case, communication can be performed by using the protection system transmission paths at a normal state where there is no break in the optical transmission paths. That is to say, this connection configuration realizes "Standby-Line-Access" and makes possible a large-capacity communication effectively utilizing the protection system optical transmission paths in the ring. In this optical transmission apparatus 167-3, however, in case that an optical transmission path breaks in the ring, communication is immediately shut down due to no duplication.

Next, a recovery operation is described in case that a failure has occurred in a transmission path and the like in the first embodiment FIG. 3 with reference to FIG. 4.

In FIG. 4, first in a normal state, data signals are sent and received between the nodes 1 and 4 through the two working system transmission paths. The nodes 1 and 4 each specify a route by adding or dropping a desired signal by means of an optical ADM 521 composed of 2×2 optical switches inside the node.

Restoring operation in case that the two working system transmission paths have been broken between the nodes 1 and 2 is shown in FIG. 4(*a*). In this case, the node 1 changes the route by means of a 4×4 optical switch 511 so as to input/output an optical signal which has been route-connected so as to be inputted/outputted to the working system transmission path side between the nodes 1 and 2 to the protection system transmission path side between the nodes 1 and 2. And the node 2 changes the route by means of a 4×4 optical switch 513 so as to input/output an optical signal which has been route-connected so as to be inputted/outputted to the working system transmission path side between the nodes 1 and 2 to the protection system transmission path side between the nodes 1 and 2. By doing this, it is possible to avoid the broken transmission paths and secure communication of data signals.

Figure 5:
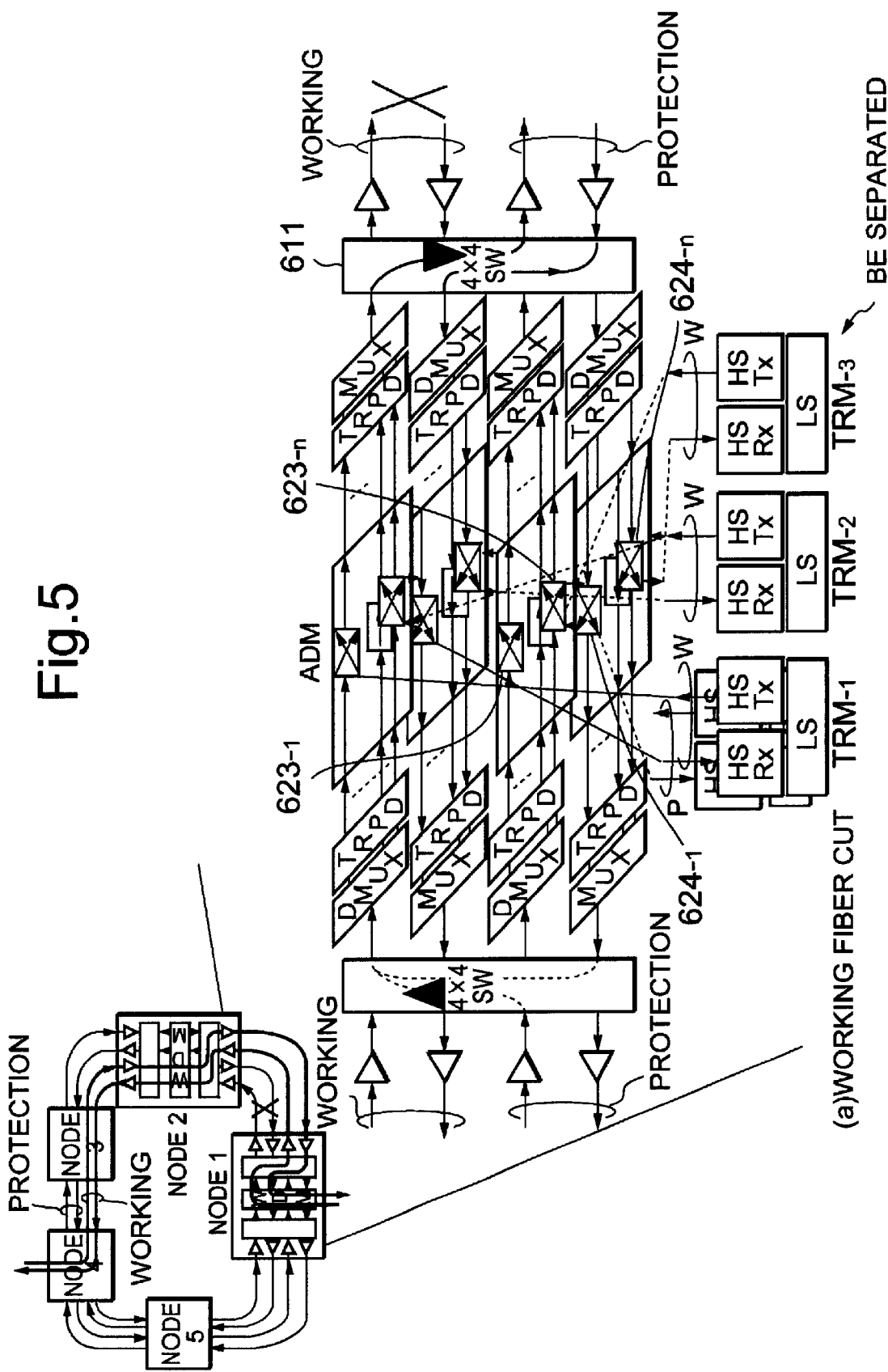
FIG. 5 is a diagram for explaining a recovery operation in case that a failure has occurred in the first or second embodiment of an optical transmission apparatus of the present invention.

Operation of the 4×4 optical switch of the node 1 performing this operation is shown in FIG. 5. In this case, the communication route of an optical transmission apparatus (TRM3) connected to the protection system of the ring is immediately disconnected.

Operation in case that transmission paths of both the working system and the protection system are broken between the nodes 1 and 2 is shown in FIG. 4(*b*). In this case, the node 1 changes the route by means of the 4×4 optical switch 511 so as to input/output an optical signal which has been route-connected so as to be inputted/outputted to the working system transmission path side between the nodes 1 and 2 to the opposite side protection system transmission path side between the nodes 1 and 2. And at the same time, the optical ADM 511 inside the node 1 brings all 2×2 optical switches which have been in a cross state of being connected to the protection system into a bar state so that a working system signal can pass the protection system. And the node 2 also performs the same switching operation as the node 1, namely, changes the route by changeover of the 4×4 optical switches and changeover of the protection system 2×2 optical switches from the cross state to the bar state. By doing this, it is possible to avoid broken transmission paths and secure communication of data signals.

Figure 6:
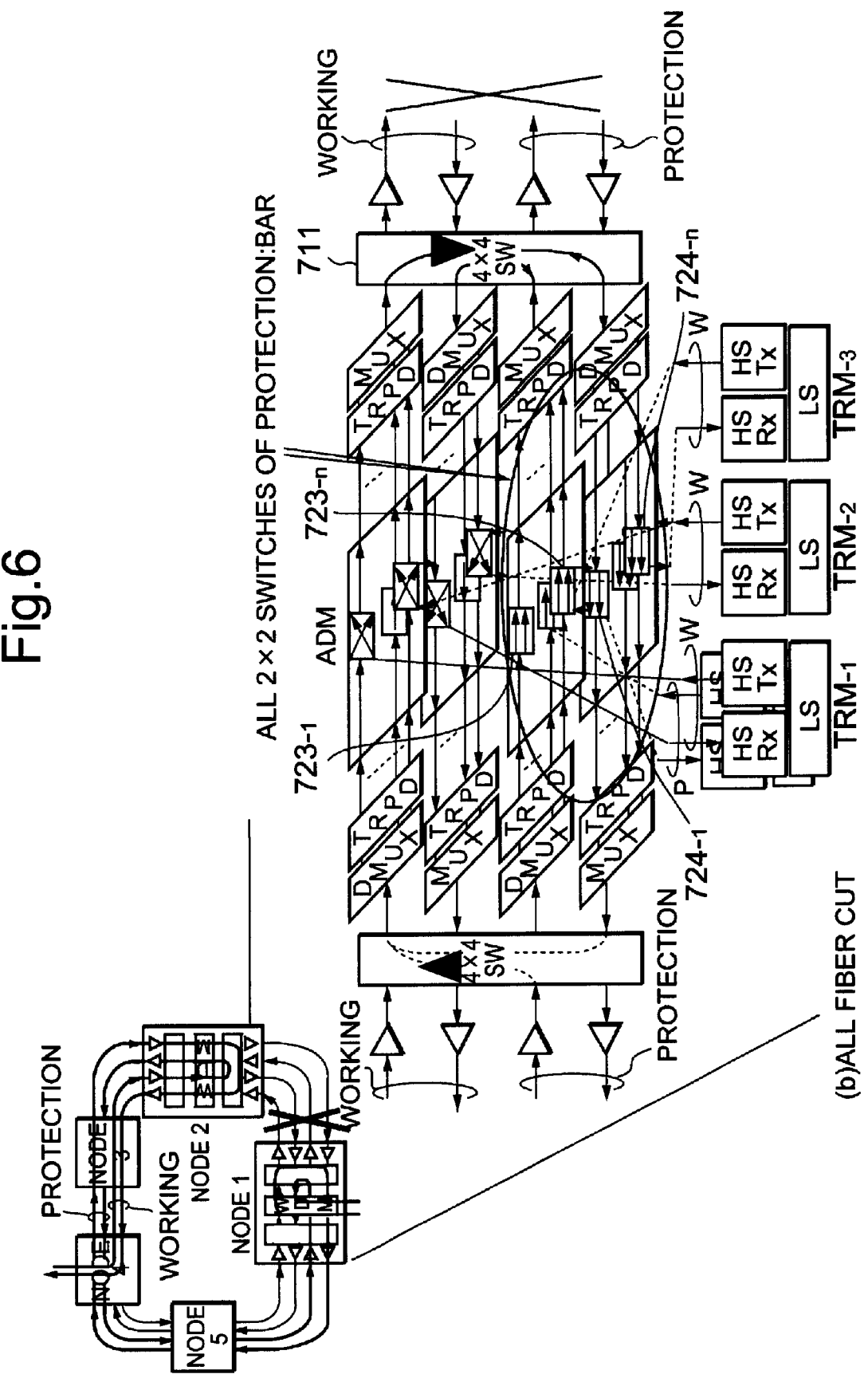
FIG. 6 is a diagram for explaining a recovery operation in case that a failure has occurred in the first or second embodiment of an optical transmission apparatus of the present invention.

FIG. 6 shows operation of the 4×4 optical switch and operation of the 2×2 optical switch of the node 1 performing this operation. In this case also, the communication route of the optical transmission apparatus (TRM3) connected to the protection system of the ring is immediately disconnected.

Figure 7:
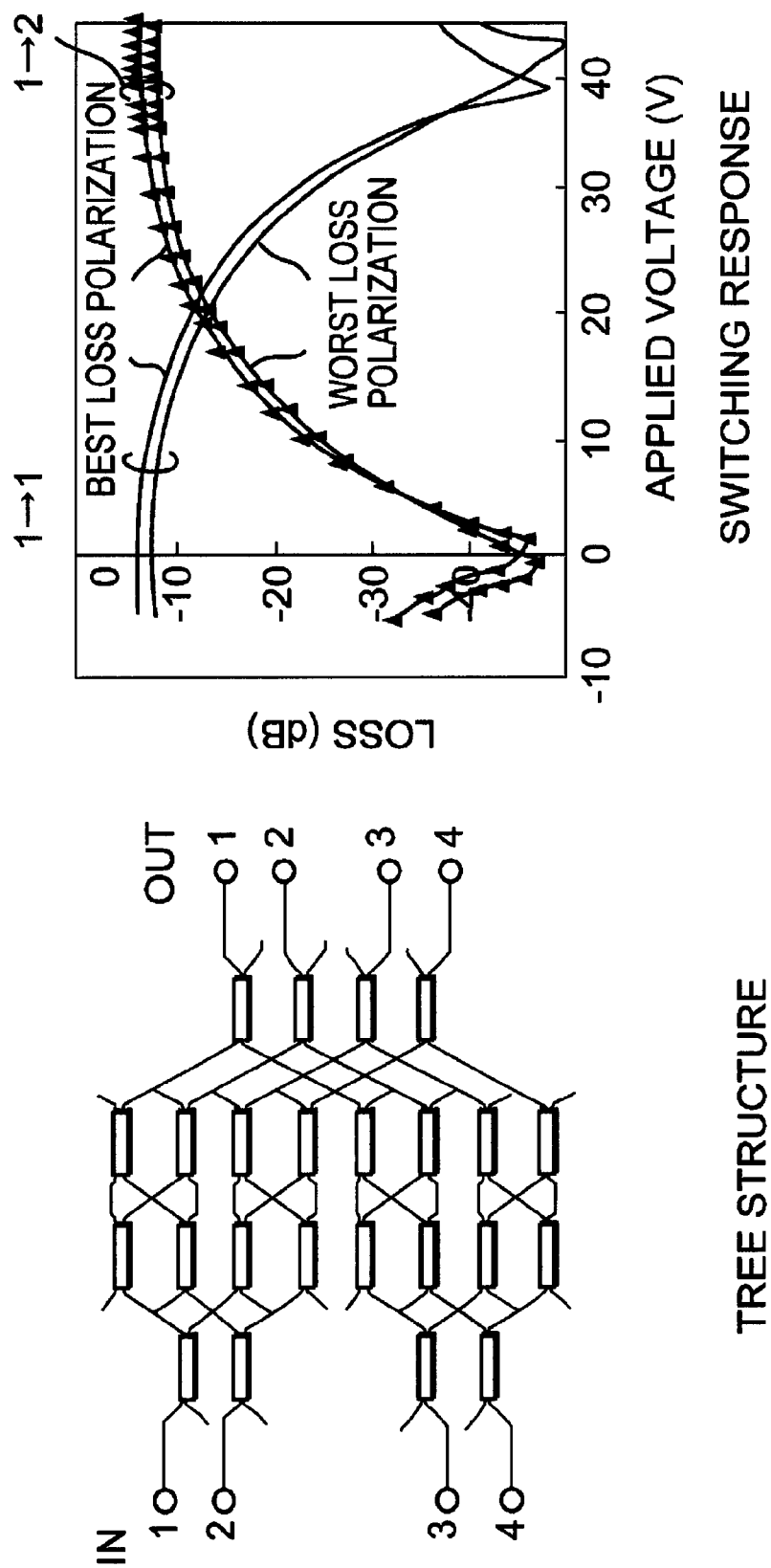
FIG. 7 is a diagram showing the configuration of an optical switch used in the present invention.

FIG. 7 shows an example for the 4×4 optical switch structure and a switching performance. The 4×4 optical switch shown in FIG. 7 is an example of a 4×4 optical switch of a tree structure, and is formed on a lithium niobate (LiNbO3) substrate.

Figure 8:
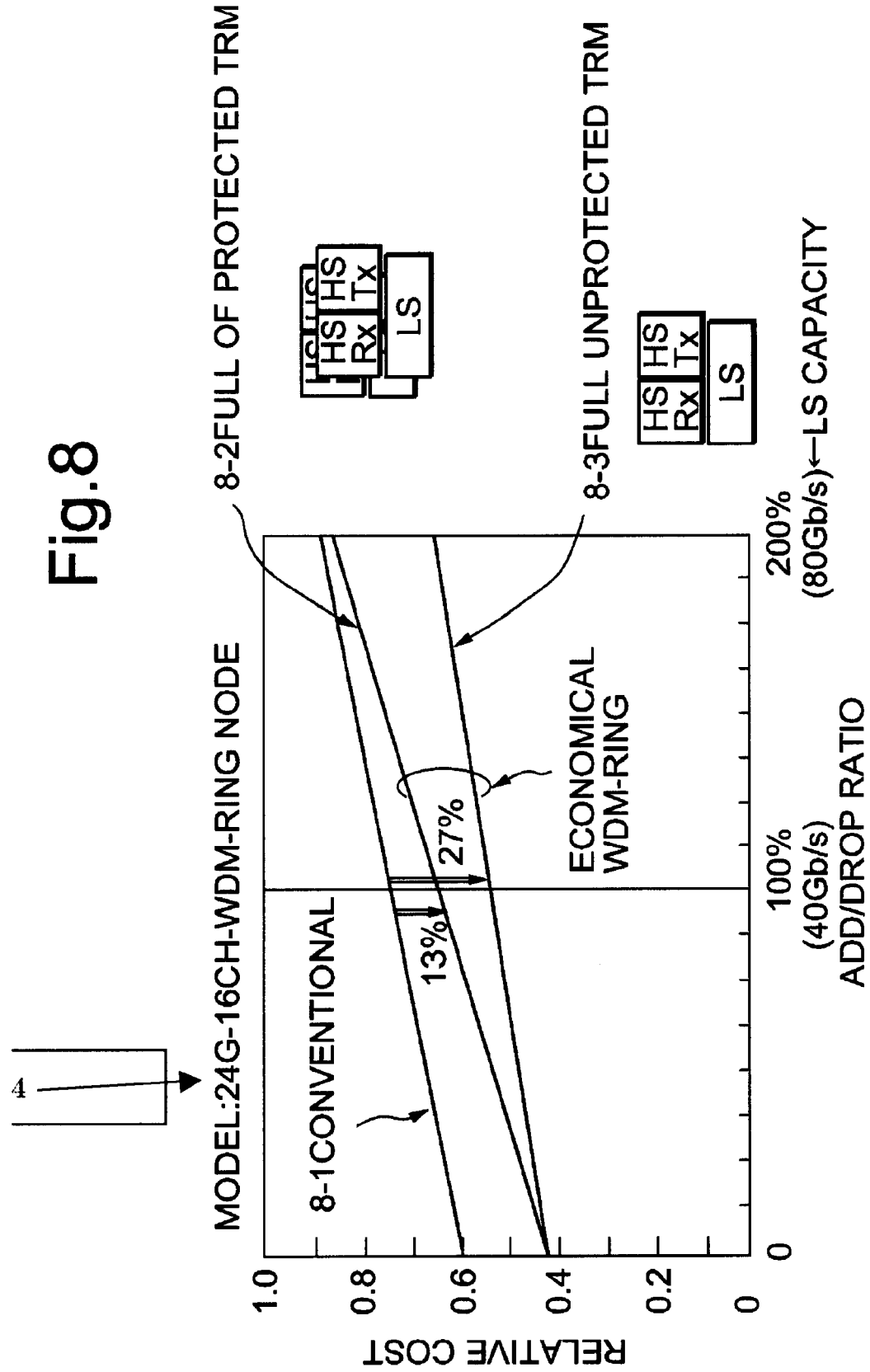
FIG. 8 is a diagram for explaining that the present invention is more cost-effective than the prior arts.

FIG. 8 shows a cost merit of this apparatus. In a method of the present invention, since an electrical cross-connecting part becomes unnecessary in an optical transmission apparatus, it is possible to reduce the cost lower than the prior example by about 27%.

Embodiment 2

Figure 9:
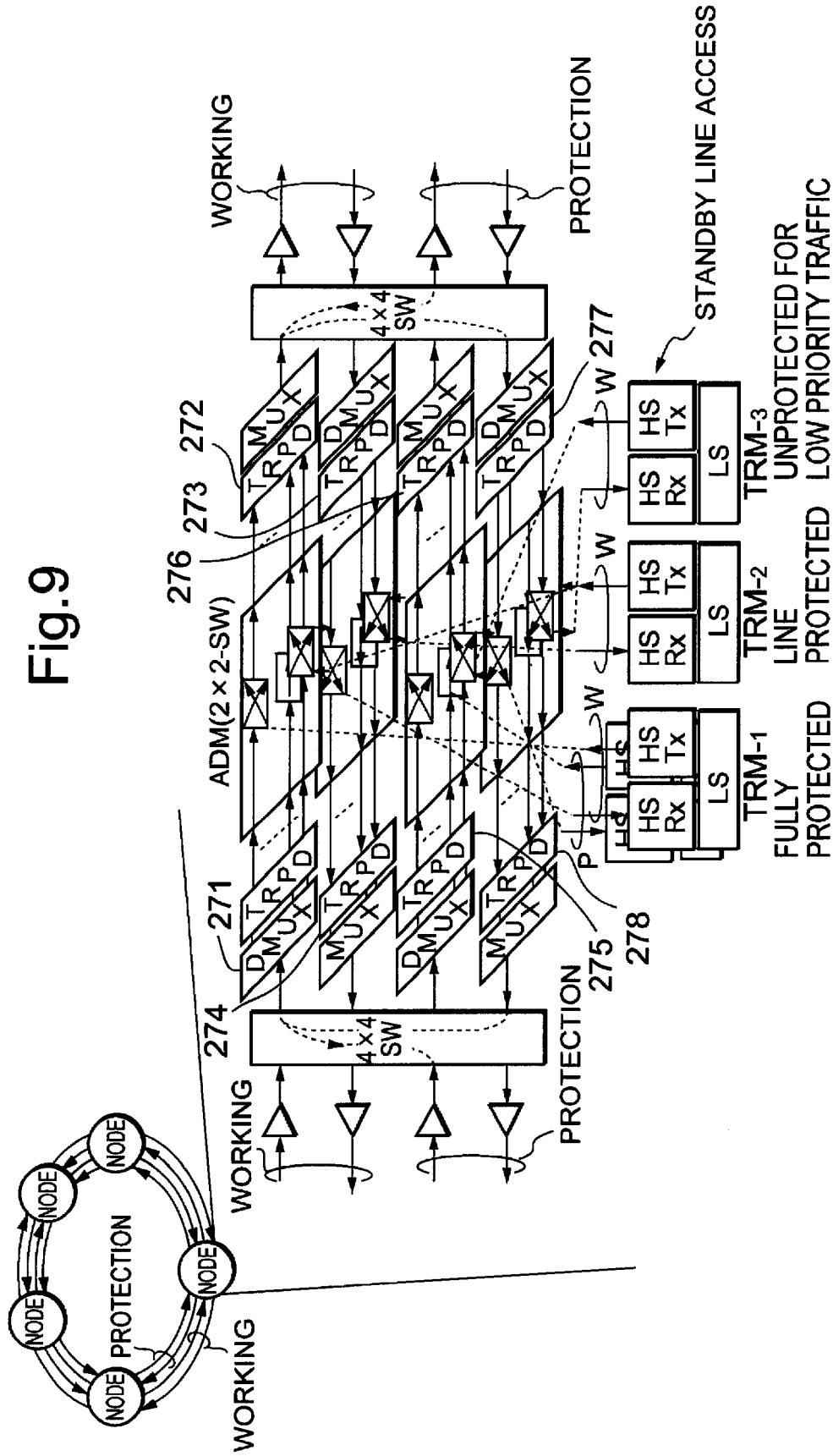
FIG. 9 shows the configuration of the second embodiment of an optical transmission apparatus of the present invention.

FIG. 9 shows a second embodiment of the present invention. The configuration shown in FIG. 9 is obtained by newly inserting transponders (271, 272, 273, 274, 275, 276, 277 and 278) between wavelength the demultiplexers and the 2×2 optical switches and between the 2×2 optical switches and the wavelength multiplexers in the configuration shown in FIG. 3.

Figure 10:
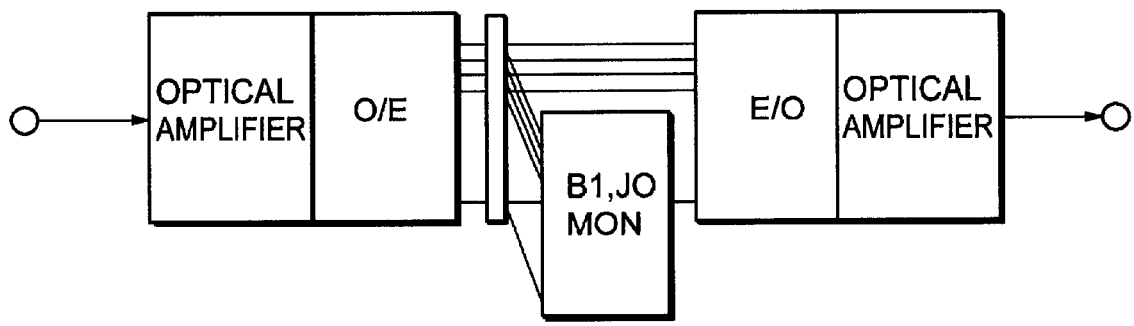
FIG. 10 shows the configuration of a transponder.

A blockdiagram for a transponder is shown in FIG. 10. The transponder converts an inputted optical signal into an electrical signal and then converts again this electrical signal to an optical signal and sends it out. Concretely, the transponder is composed of an optical receiver, an optical signal monitoring circuit and an optical transmitter. In order to realize a sufficient receiver sensitivity and greatly lengthen the distance between nodes, optical amplifiers are connected to the input and output parts of it. The transponder can improve the S/N ratio of an optical signal by regeneratively repeating the inputted optical signal. Additionally, it can perform a wavelength conversion of an inputted optical signal by using an optical transmitter with its output wavelength different from a received optical signal.

In addition to the above-mentioned functions, the optical signal monitoring circuit in the transponder monitors the quality of an optical signal and issues an alarm. For example, it will be sufficient to monitor a B1 byte or a J0 byte in a frame structure of SDH (Synchronous Digital Hierarchy) for an optical signal conforming to the standard of SDH. The B1 byte is a calculated parity of a transmission signal. The J0 byte is called "section trace" and is used for monitoring a connection state of optical fibers.

An advantage of making it possible to lengthen the optical transmission path of a ring can be obtained by adopting transponders.

Embodiment 3

Figure 11:
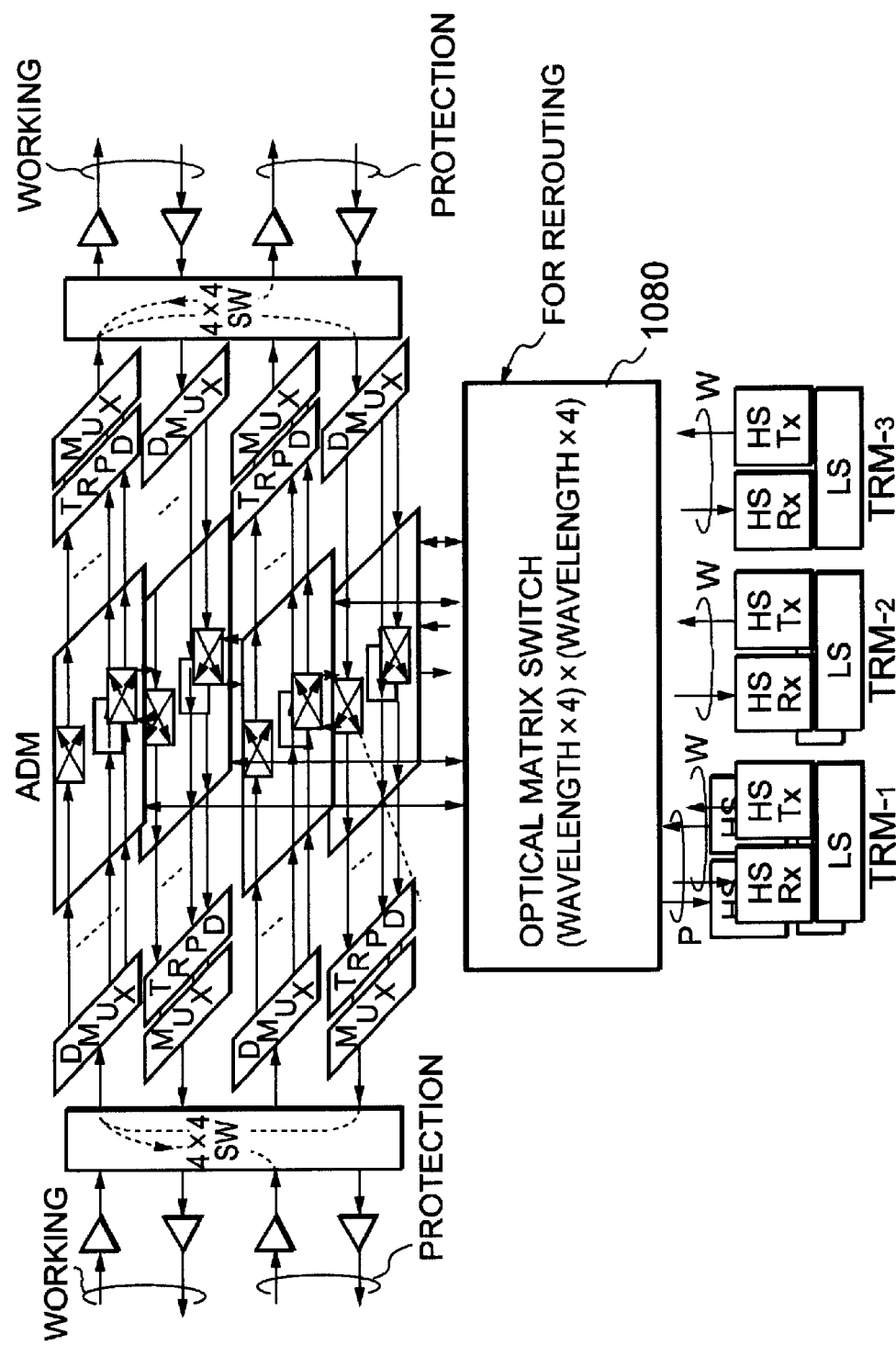
FIG. 11 shows the configuration of a third embodiment of an optical transmission apparatus of the present invention.

FIG. 11 shows a third embodiment of the present invention. The node structure of FIG. 11 is nearly equivalent to that in FIG. 9. The difference is that the node in FIG. 11 has an optical matrix switch 1080 between the 2×2 optical switches and the optical transmission apparatuses.

An advantage of making it easy to perform a rerouting management of communication between the optical transmission apparatuses in a ring can be obtained by inserting this optical matrix switch 1080. A ring network being high in flexibility can be built by remote controlling the optical matrix switch 1080.

Figure 12:
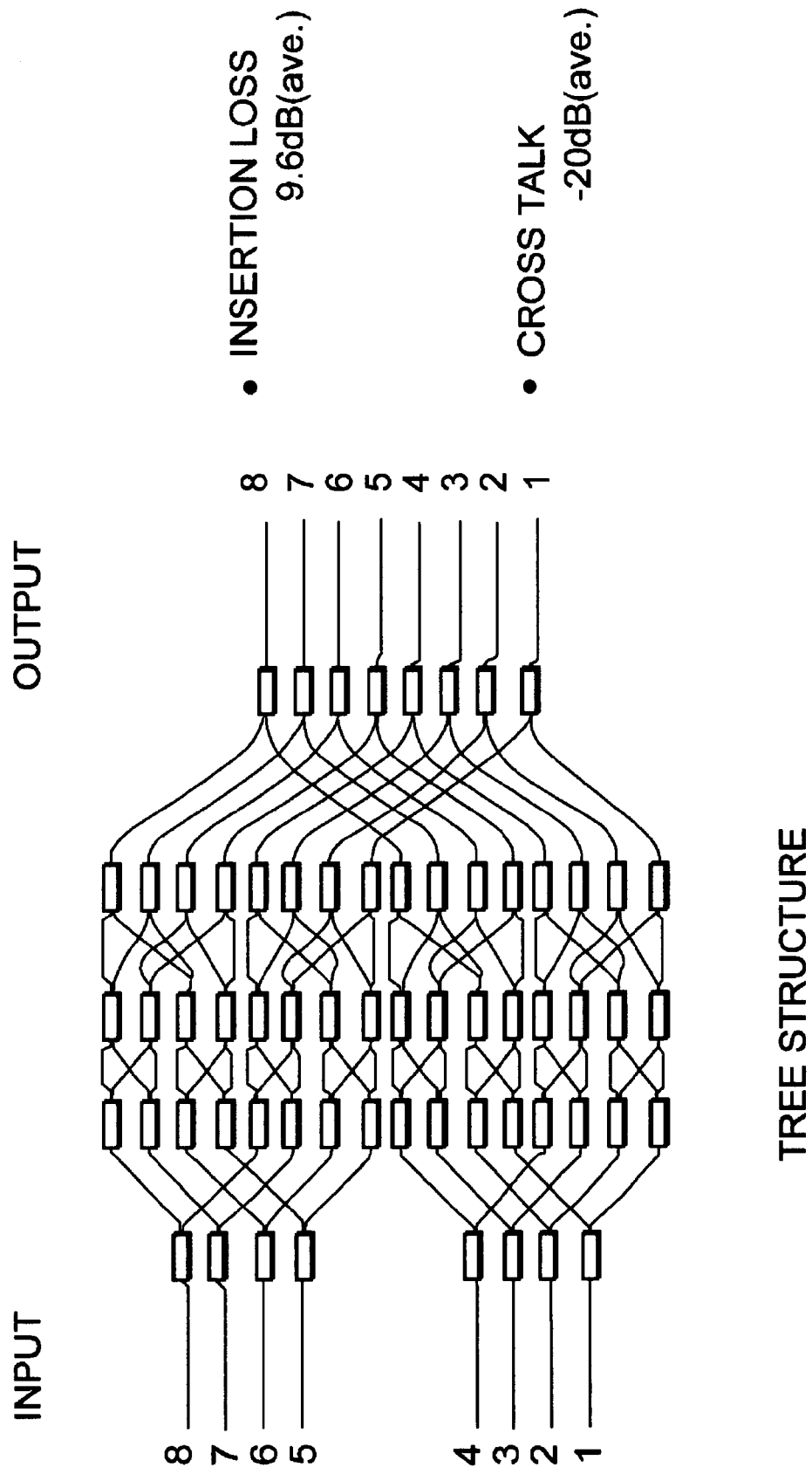
FIG. 12 shows the configuration of an optical switch used in a third or fourth embodiment of an optical transmission apparatus of the present invention.
Figure 13:
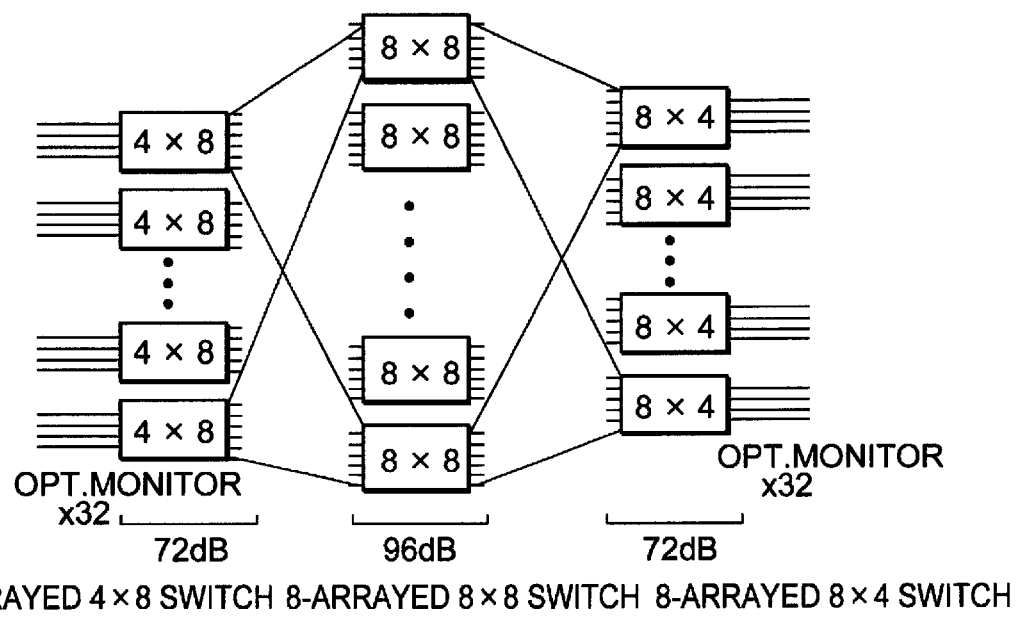
FIG. 13 shows the configuration of an optical switch used in the third or fourth embodiment of an optical transmission apparatus of the present invention.
Figure 14:
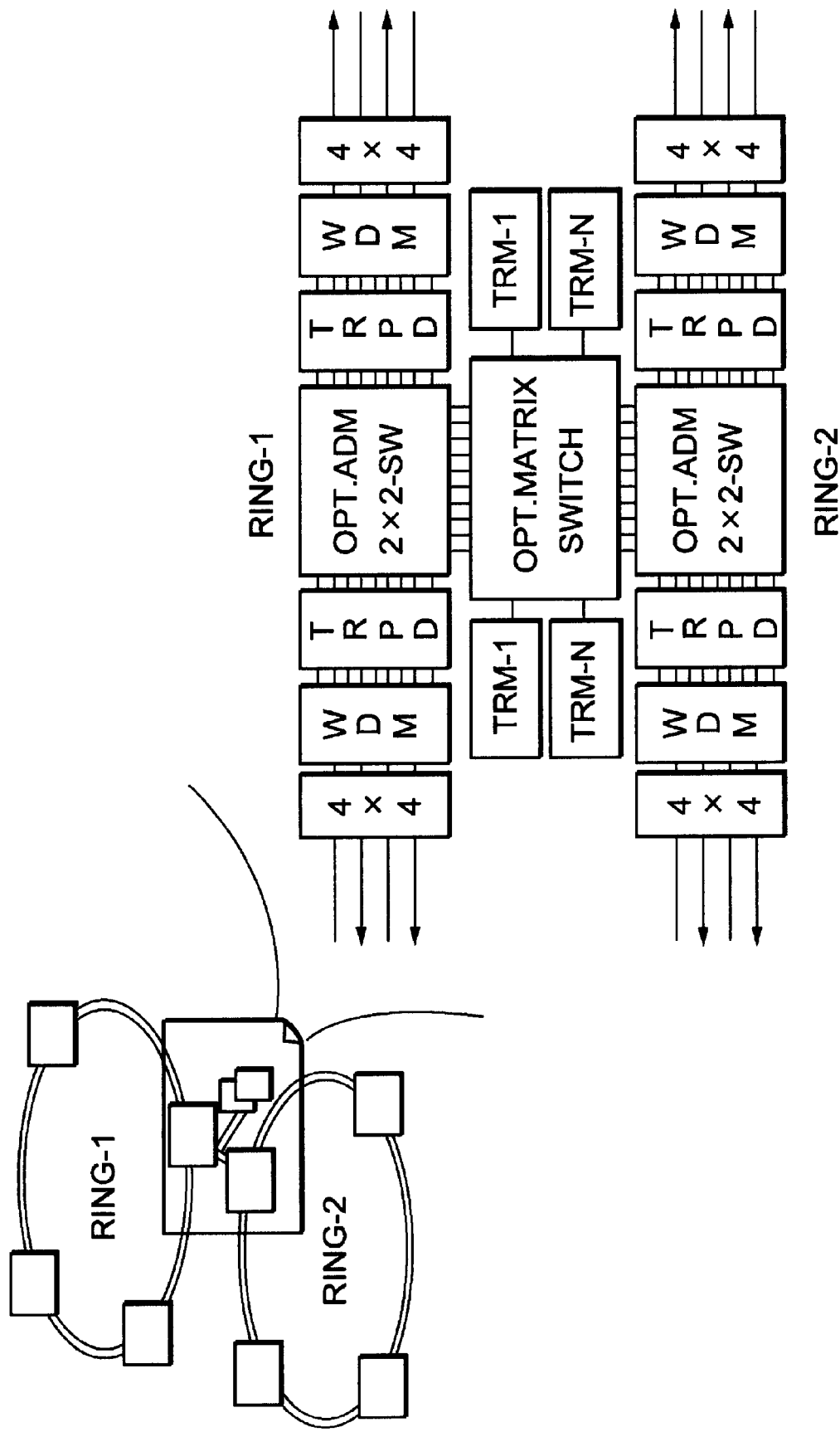
FIG. 14 shows the configuration of an example of applying the third or fourth embodiment of an optical transmission apparatus of the present invention to a system in which a wavelength-division multiplexing optical transmission apparatus having two ring structures is connected.

An 8×8 optical switch of a structure shown in FIG. 12 and a 32×32 optical switch of a structure shown in FIG. 13 can be applied to this optical matrix switch 1080. And application of it to a node coupling different rings as shown in FIG. 4 is effective as an example of applications of the node according to FIG. 11. In this case, a rerouting operation of an optical signal between the rings can be easily managed by the optical matrix switch.

Embodiment 4

Figure 15:
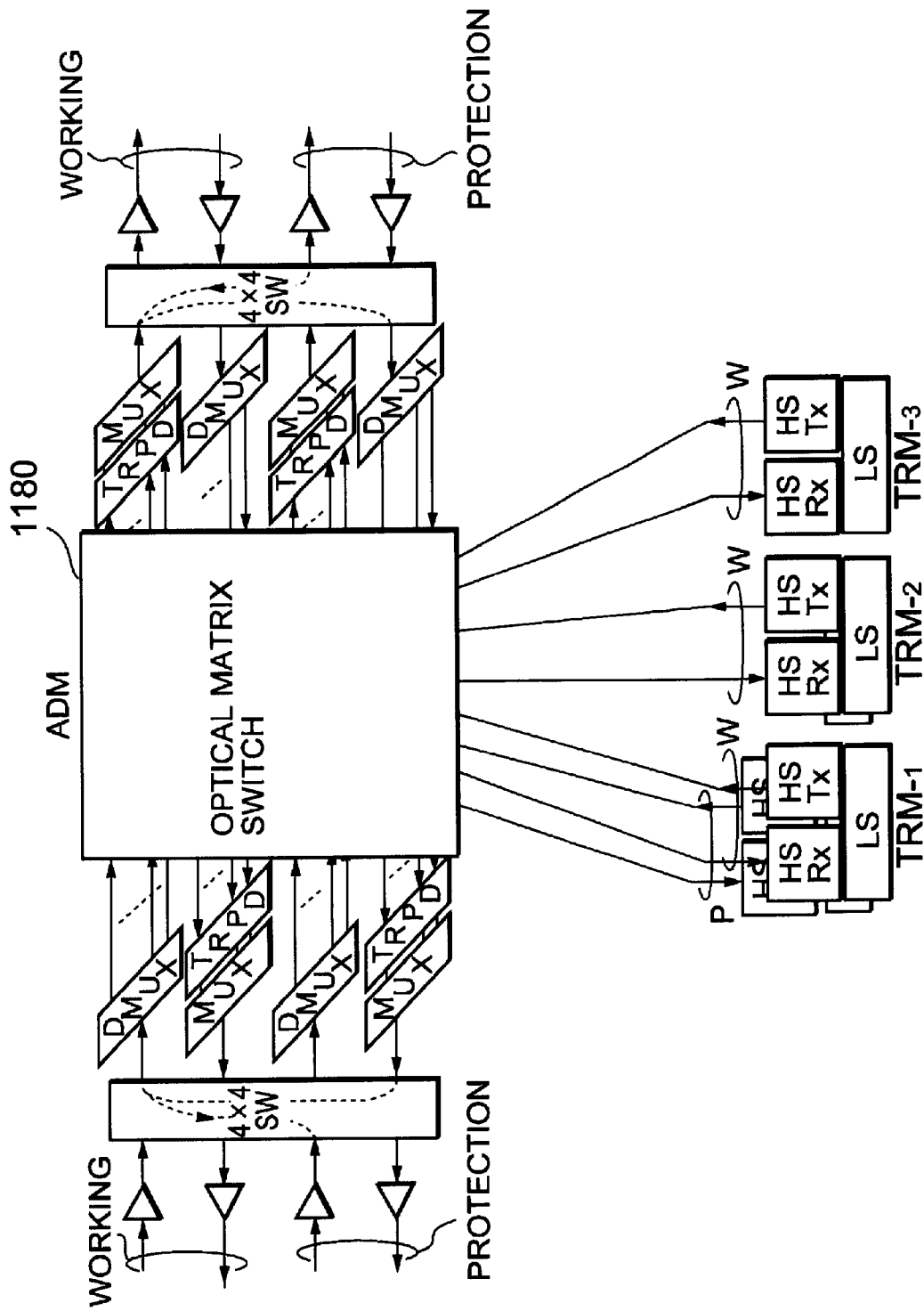
FIG. 15 shows the configuration of the fourth embodiment of an optical transmission apparatus according to the present invention.

FIG. 15 shows a fourth embodiment of the present invention. The node shown in FIG. 15 can realize a function equivalent to that in FIG. 11, but an optical matrix switch 1180 shown in FIG. 15 performs operation of both the optical matrix switch 1080 and the 2×2 optical switch in FIG. 11. With a simple, economical structure, this embodiment can realize a rerouting operation of an optical signal in a ring node.

As described above, since the present invention can cope with an optical transmission path failure by means of a pair of 4×4 optical switches without using plural electrical cross-connecting parts in an optical transmission apparatus in each node, it is possible to reduce the cost of a system without sacrificing reliability in comparison with the prior arts.

And since the protection system transmission paths in a ring can be also used for communication other than that of the working system by using 2×2 optical switches provided in a node, the invention can contribute to the enlargement and effective utilization of transmission capacity.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical communication node which is inserted in first and second working optical paths and first and second protection optical paths for transmitting a wavelength-multiplexed optical signal and which transmits and receives said wavelength-multiplexed optical signal, said optical communication node comprising;
    a first to a fourth wavelength demultiplexer,
    a first to a fourth optical coupler,
    a first optical switch in which the input terminals of said first and second wavelength demultiplexers are respectively connected with its first and third output ports, said second working optical path is connected with its second output port, said second protection optical path is connected with its fourth output port, the output terminals of said first and second optical coupler are respectively connected with its second and fourth input ports, said first working optical path is connected with its first input port, and said first protection optical path is connected with its third input port,
    a second optical switch in which the input terminals of said third and fourth wavelength demultiplexers are respectively connected with its second and fourth output ports, said first working optical path is connected with its first output port, said first protection optical path is connected with its third output port, the output terminals of said third and fourth optical couplers are respectively connected with its first and third input ports, said second working optical path is connected with its second input port, and said second protection optical path is connected with its fourth input port, and
    a third optical switch in which the output terminals of said first to fourth wavelength demultiplexers are connected with its input ports and the input terminals of said first to fourth optical couplers are connected with its output ports.

2. An optical communication node as defined in claim 1, wherein;
    said third optical switch comprises a plurality of 2-input optical switches in which the first input ports are connected with the output terminals of said first to fourth wavelength demultiplexers and the first output ports are connected with the input terminals of said first to fourth optical couplers, and which selectively output an optical signal inputted through an input port from one of the output ports according to a selection signal applied from the outside.

3. An optical communication node as defined in claim 2, further comprising;
    a receiving circuit in which its reception signal input terminal is connected with the second output ports of some 2-input optical switches out of said plural 2-input optical switches and which converts a reception optical signal inputted through said reception signal input terminal into an electrical signal, and
    a transmitting circuit in which transmission signal output terminal is connected with the second input ports of some 2-input optical switches out of said plural 2-input optical switches and which converts an electrical signal into an optical signal and outputs the transmission optical signal through said transmission signal output terminal.

4. An optical communication node as defined in claim 2, further comprising;
    a fourth optical switch in which its input ports are connected with the second output ports of said plural 2-input optical switches and its output ports are connected with the second input ports of said plural 2-input optical switches,
    a receiver in which its reception signal input terminal is connected with the output ports of said fourth optical switch and which converts a reception optical signal inputted through said reception signal input terminal into an electrical signal, and
    a transmitter in which its transmission signal output terminal is connected with the input ports of said fourth optical switch and which converts an electrical signal into an optical signal and outputs the transmission optical signal through said transmission signal output terminal.

5. An optical communication node as defined in claim 1, further comprising;
    a first to an eighth transponder each having a function for converting each of optical signals inputted from plural input terminals into an electrical signal and then converting said electrical signals again into second optical signals and outputting said second optical signals through plural output terminals, said first to fourth transponders being respectively inserted between said first to fourth wavelength demultiplexers and said third optical switch, and said fifth to eighth transponders being respectively inserted between said first to fourth optical couplers and said third optical switch.

6. An optical communication node as defined in claim 5, wherein;

said third optical switch is provided with a plurality of 2-input optical switches in which the first input ports are respectively connected with said plural output terminals of said first to fourth transponders, the first output ports are respectively connected with said plural input terminals of said fifth to eight transponders, and which selectively output an optical signal inputted through an input port from one of the output ports according to a selection signal applied from the outside.

7. An optical communication node as defined in claim 5, wherein;

said transponder comprises;

an optical receiver which converts an optical signal inputted from each of said plural input terminals into a reception electrical signal and outputs said reception electrical signal, an optical state monitoring circuit which detects a state of said optical signal by monitoring said reception electrical signal and outputs it as a monitor signal, and an optical transmitter circuit which converts said reception electrical signal into a transmission optical signal and outputs said transmission optical signal to said plural output terminals.

8. An optical communication node as defined in claim 1, wherein;

said first to fourth wavelength demultiplexers and said first to fourth optical couplers each comprise an arrayed waveguide grating.

9. An optical communication node as defined in claim 1, wherein;

said first to fourth optical couplers each comprise an optical tree coupler.

10. An optical communication node as defined in claim 1, further comprising;

at least one first optical amplifier inserted between two connection points of said first working optical path and said optical communication node, at least one second optical amplifier inserted between two connection points of said second working optical path and said optical communication node, at least one third optical amplifier inserted between two connection points of said first protection optical path and said optical communication node, and at least one fourth optical amplifier inserted between two connection points of said second protection optical path and said optical communication node.

11. An optical communication node as defined in claim 10, wherein;

said first to fourth optical amplifiers each comprise an optical fiber amplifier.

12. An optical communication node as defined in claim 10, wherein;

said first to fourth optical amplifiers each comprise a semiconductor optical amplifier.

13. An optical transmission apparatus in which plural optical communication nodes are connected in the form of a ring through a first and a second working optical path and a first and a second protection optical path, said optical transmission apparatus transmitting a wavelength-multiplexed optical signal, wherein said optical communication node comprises;

a first to a fourth wavelength demultiplexer, a first to a fourth optical coupler, a first optical switch in which the input terminals of said first and second wavelength demultiplexers are respectively connected with its first and third output ports, said second working optical path is connected with its second output port, said second protection optical path is connected with its fourth output port, the output terminals of said first and second optical couplers are respectively connected with its second and fourth input ports, said first working optical path is connected with its first input port, and said first protection optical path is connected with its third input port, a second optical switch in which the input terminals of said third and fourth wavelength demultiplexers are respectively connected with its second and fourth output ports, said first working optical path is connected with its first output port, said first protection optical path is connected with its third output port, the output terminals of said third and fourth optical couplers are respectively connected with its first and third input ports, said second working optical path is connected with its second input port, and said second protection optical path is connected with its fourth input port, and a third optical switch in which the output terminals of said first to fourth wavelength demultiplexers are connected with its input ports and the input terminals of said first to fourth optical couplers are connected with its output ports.

14. An optical transmission apparatus as defined in claim 13, wherein;

at least one of said plural optical communication nodes further comprises;

a fourth optical switch in which its input ports are connected with the second output ports of said plural 2-input optical switches and its output ports are connected with the second input ports of said plural 2-input optical switches, a receiver in which its reception signal input terminal is connected with the output ports of said fourth optical switch and which converts a reception optical signal inputted through said reception signal input terminal into an electrical signal, and a transmitter in which its transmission signal output terminal is connected with the input ports of said fourth optical switch and which converts an electrical signal into an optical signal and outputs the transmission optical signal through said transmission signal output terminal.

15. A transmission apparatus failure recovering method for an optical transmission apparatus as defined in claim 13, said transmission apparatus failure recovering method comprising;

detecting that a second working optical path and a first working optical path have become untransmissible between said two optical communication nodes being adjacent to each other, and changing over the internal connections to said first input port and said second output port respectively to said third input port and said fourth output port in said first optical switch, and changing over the internal connections to said first output port and said second input port respectively to said third output port and said fourth input port in said second optical switch with regard to the internal connection state of an optical switch being closer to an untransmissible failure point out of said first and second optical switches contained in said two optical communication nodes, in case of detecting that they have become untransmissible.

16. A transmission apparatus failure recovering method for an optical transmission apparatus as defined in claim 13, said transmission apparatus failure recovering method comprising;

detecting that all transmission paths have become untransmissible between said two optical communication nodes being adjacent to each other, and changing over the internal connections to said first input port and said second output port respectively to said fourth input port and said third output port in said first optical switch, and changing over the internal connections to said first output port and said second input port respectively to said fourth output port and said third input port in said second optical switch with regard to the internal connection state of an optical switch being closer to an untransmissible failure point out of said first and second optical switches contained in said two optical communication nodes, in case of detecting that they have become untransmissible.

* * * * *